(12) United States Patent
Hansen et al.

(10) Patent No.: US 6,730,730 B1
(45) Date of Patent: May 4, 2004

(54) RESIN FOR A MINERAL WOOL BINDER COMPRISING THE REACTION PRODUCT OF AN AMINE WITH A FIRST AND SECOND ANHYDRIDE

(75) Inventors: Erling Hansen, Gentofte (DK); Povl Nissen, Ølstykke (DK); Thor Husemoen, Roskilde (DK); Dirk Armand Wim Stanssens, Houthalen (BE)

(73) Assignee: Rockwool International A/S (DK)

( * ) Notice: Subject to any disclaimer, the term of this patent is extended or adjusted under 35 U.S.C. 154(b) by 0 days.

(21) Appl. No.: 10/031,054

(22) PCT Filed: Jul. 7, 2000

(86) PCT No.: PCT/EP00/06978

§ 371 (c)(1),
(2), (4) Date: Apr. 26, 2002

(87) PCT Pub. No.: WO01/05725

PCT Pub. Date: Jan. 25, 2001

(30) Foreign Application Priority Data

Jul. 16, 1999 (EP) .............................................. 99202343

(51) Int. Cl.$^7$ ................................................. C08K 3/40
(52) U.S. Cl. ........................ 524/494; 524/773; 524/219; 525/33; 525/35; 525/443; 528/272; 528/291; 528/310

(58) Field of Search ................................ 524/494, 493, 524/249, 247; 528/291, 272, 310, 335; 525/443

(56) References Cited

U.S. PATENT DOCUMENTS

| 3,767,671 A | | 10/1973 | Klebe et al. |
| 4,074,988 A | | 2/1978 | Eilerman et al. |
| 5,883,208 A | * | 3/1999 | Deviny ........................ 526/198 |
| 6,071,994 A | * | 6/2000 | Hummerich et al. ........ 524/247 |
| 6,392,006 B1 | * | 5/2002 | Van Benthem et al. ..... 528/291 |

FOREIGN PATENT DOCUMENTS

| EP | 0 354 361 A | 2/1990 |
| EP | 0 726 252 A | 8/1996 |
| EP | 0 826 710 A | 3/1998 |

* cited by examiner

*Primary Examiner*—Katarzyna Wyrozebski
(74) *Attorney, Agent, or Firm*—Webb Ziesenheim Logsdon Orkin & Hanson, P.C.

(57) ABSTRACT

Resin for a binder suitable for mineral fibers such as glass or stone wool, said resin comprising the reaction product of a polymer free mixture of an amine with a first anhydride and a second anhydride, characterized in that the first and second anhydrides are different anhydrides.

30 Claims, No Drawings

RESIN FOR A MINERAL WOOL BINDER COMPRISING THE REACTION PRODUCT OF AN AMINE WITH A FIRST AND SECOND ANHYDRIDE

BACKGROUND OF THE INVENTION

1. Field of the Invention

The invention relates to a compound or salts thereof suitable for use as a binder for mineral fibres, i.e. men made vitreous fibres (MMVF), for example glass slag or stone wool, i.e. mineral wool, in particular Rockwool, a binder composition comprising such a compound, a process for providing said compound and composition, a mineral fibre product provided with such a binder and the use of said compound and composition as a mineral fibre binder.

2. Description of the Related Art

Phenol and formaldehyde resins which are mainly used as binders for glass or stonewool release toxic substances during curing, for example formaldehyde.

During application and curing of the binders, after provision thereof to the mineral fibres, phenol, formaldehyde and ammonia are released. From an environmental point of view this is undesirable.

Furthermore during application, mostly by spraying, of the binder onto the spun glass or stone fibres a large amount of binder is lost, which is almost impossible to recover for re-use.

A formaldehyde and phenol free resin suitable for a binder for mineral wool fibres is described in the patent application PCT/NL99/00029 from the applicant.

SUMMARY OF THE INVENTION

According to a first aspect of the present invention there is provided a resin for a binder suitable for mineral fibers such as glass or stone wool.

The inventors have found that the resin obtained on mixing together different cyclic anhydrides, preferably an aliphatic anhydride and an aromatic anhydride in a polymer free mixture with an amine, provides a resin suitable for a mineral wool binder, which has desirable curing times.

The inventors theorize that the increased curing speed may not only be related to the combined use of cyclic anhydrides, but also to the adjustment of the pH, preferably to between 2.5 and 4.2, by employing aromatic carboxylic acids. These carboxylic acids are more acidic than aliphatic ones. Trimellitic anhydride is even more acidic due to the presence of an extra electron withdrawing group.

According to a second aspect of the present invention there is provided a binder.

According to a further aspect of the present invention there is provided a mineral fibre product.

According to yet a further aspect of the present invention there is provided a process for providing a polymer free resin for a binder suitable for binding mineral fibre products.

According to yet another use of the present invention there is provided the use of the above referred to resin in a mineral wool binder.

DESCRIPTION OF THE PREFERRED EMBODIMENTS

The invention will now be further clarified by way of the following description with reference to the examples.

Three binder compositions were made up according to the Mol.ratios as shown in table 1, whereby various accelerators were added to these compositions (see column 3 of table 1).

EXAMPLE 1

Binder 1

A double jacketed glass reactor, heated with hot water, provided with a magnetic stirrer and a reflux condenser is used.

158 g diethanolamine (DEA) and 100 g water were brought into the reactor and heated to 70° C.

Then 228 g tetrahydrophthalic anhydride (THPA) was added allowing the temperature to raise to 90° C. This gives molratio DEA:THPA=1:1.

The reaction time was allowed to be 120 minutes before cooling of the resin.

Another resin with molratio DEA (158 g):THPA (365 g)=1:1,4 was made in the same way.

The binder solution was made by diluting the resin to about 40% solids with water. When accelerators were used they were added to the binder solution when it was ready for testing.

Binder 2

The same equipment and procedure were used as for binder 1, except that phthalic anhydride (PTA) was added to the mixture when all THPA was dissolved.

3 resins were made with different molratios of the compounds.

Molratios Used are:
DEA (158 g):THPA (228 g):PTA (89 g)=1:1:0,4
DEA (158 g):THPA (183 g):PTA (133 g)=1:0,8:0,6
DEA (158 g):THPA (137 9):PTA (178 g)=1:0,6:0,8

The binder solution was made by diluting the resin to about 40% solids with water. When accelerators were used they were added to the binder solution when it was ready for testing.

Binder 3

The same equipment and procedure were used as for binder 1, except that trimellitic anhydride (TMA) was added to the mixture when all THPA was dissolved.

4 resins were made with different molratios of the compounds.

Molratios Used are:
DEA (158 g):THPA (297 g):TMA (29 g)=1:1,3:0,1
DEA (158 g):THPA (274 g):TMA (58 g)=1:1,2:0,2
DEA (158 g):THPA (228 g):TMA (115 g)=1:1:0,4
DEA (158 g):THPA (183 g):TMA (173 g)=1:0,8:0,6

The binder solution was made by diluting the resin to about 40% solids with water. When accelerators were used they were added to the binder solution when it was ready for testing.

EXAMPLE 2

The curing characteristic of binders 1–4 were measured, the results of which are shown in table 1. These show the reaction time at a certain temperature, measured as the time necessary to obtain a "not flowing" behaviour of the binder expressed as "flow time".

Procedure:

3 droplets of binder solution (about 40% solids) are placed on a thin "Microscope glass cover slip" and dried in an incubator at 90° C. for 45 minutes.

The "flow time" is measured by placing the pre-dried "microscope slip" on a metal plate with a pre-set temperature at 200° C. (Used is a Stork-Tronic Preziterm heating table.)

A very thin spatula or similar is used to stir the binder. When the binder becomes high viscous and sticks to the spatula, the time is measured as the "flow time".

5 samples are done, and by experience of the foregoing you wait as long as possible before start stirring to avoid cooling by the stirrer.

The average of the 2 last samples are used as the "flow time".

TABLE 1

| Composition of binder | Mol. ratios: | Accelerator- % of solids | Flow-time minutes | Mechanical strength Unaged | Mechanical strength Aged |
|---|---|---|---|---|---|
| 1) DEA:THPA | 1:1 | none | >10 | 4.80 | 2.55 |
| | | Citric acid 0.3–2% | 5 | | |
| | | Hypophos.-acid-0.3-2% | 5 | | |
| | 1:1.4 | none | >10 | | |
| | | Citric acid-3–4% | 7 | | |
| | | Hypophos.-acid-1–2% | 6 | | |
| | | Na-phosphinat-4% | 7 | | |
| 2) DEA:THPA:PTA | 1:1:0.4 | none | 5 | 5.89 | 2.77 |
| | | Na-phosphinate-4% | 7 | | |
| | | Hypophos.-acid-1% | 5 | | |
| | 1:1.8:0.6 | none | 5 | 3.05 | 1.04 |
| | | Na-phosphinate-4% | 7 | | |
| | | Hypophos acid-1% | 5 | | |
| | 1:0.6:0.8 | none | 5 | | |
| | | Na-phosphinate-4% | 7 | | |
| | | Hypophos.-acid-1% | 5 | | |
| 3) DEA:THPA:TMA | 1:1.3:0.1 | none | 4 | 8.55 | 2.77 |
| | | Hypophos.-acid-0.5–1% | 4 | | |
| | 1:1.2:0.2 | none | 4 | 6.88 | 2.07 |
| | | Hypophos.-acid-0.5–1% | 4 | | |
| | 1:1:0.4 | none | 5 | 3.81 | 1.25 |
| | | Hypophos.-acid-0.2–1% | 4 | | |
| | | Na.phosphinate-4% | 2 | | |
| | 1:0.8:0.6 | none | 3 | 2.62 | |
| | | Hypophos.-acid-0.5.–1% | 3 | | |

Conclusion:

Addition of aromatic anhydrides as PTA and TMA reduce the "flowtime" with a factor 2.

Accelerators as citric acid, phosphonic acid or sodium-phosphinate reduce the "flowtime" by a factor 2 when THPA is used as the only anhydride. Accelerators do not decrease the "flowtime" further when aromatic anhydrides are in the formulation. They themselves act as an accelerator.

EXAMPLE 3

Storage Stability of Resin Made at 90° C. Reaction Temperature Compared to 70° C.

The preferred reaction temperature is 90 to 100° C. using formulations containing up till 30% W/W water of the weight of anhydride. The water is mixed with the diethanolamine before the anhydride is added.

Using lower reaction temperature may cause precipitation if stored more than 2 weeks at solids higher than 75%.

If diluted at once with water to solids below 60% no precipitation is observed.

From a storage and transport point of view it is advantageous to have as high solids content as possible.

EXAMPLE 4

Batch Reactor

The reflux cooling is started.

40 kg melted diethanolamine (60° C.) is pumped into the reactor.

The stirrer is started, 24 kg demineralized water is added and the temperature raised to 70° C.

80 kg tetrahydrophthalic anhydride is added portion wise over approximate 15 minutes, not allowing the temperature to exceed 95° C. The reactor is cooled if necessary.

The reaction temperature is held at 90–95° C. for 15 minutes after all the anhydride is dissolved.

After 15 minutes the resin was cooled to room temperature.

The resin contained approximately 80% solids determined at 200° C.

EXAMPLE 5

Continuous Reactor

A double jacketed stainless steel tube reactor with a static mixer at the inlet is used. The temperature in the reactor is steered by cooling or heating with water.

Diethanolamin at 60° C. and a water suspension of tetrahydrophtalic anhydride is pumped into the tube reactor and mixed when passing the static mixer. The temperature is raised and adjusted to 90–95° C.

Diethanolamin and the water suspension of tetrahydrophthalic anhydride are pumped from separate tanks in pre-set ratio for the resin formulation.

The flow of the components are adjusted so that it takes approximate 20 minutes after the reaction mixture has passed the static mixer, and left the reactor.

Volume of the tube reactor is 33 liters.

Flow is approximately 100 kg per hour, or 20 kg diethanolamine and 80 kg suspension containing 40 kg tetrahydrophthalic anhydride in 40 kg water, all per hour.

When the reaction mixture leaves the tube reactor it may be diluted with water to 30% solids, cooled to room temperature and is ready for use.

Other additives as silane coupling agent, curing accelerators, hydrophilic or hydrophobic agent etc. may be added to the binder "on stream" after the reactor.

The invention is not limited to the above description; the requested rights are rather determined by the following claims.

What is claimed is:

1. A resin for a binder suitable for mineral fibers such as glass or stone wool, said resin comprising the reaction product of a polymer free mixture of an amine with a first anhydride and a second aromatic anhydride, characterized in that the first anhydride and the second aromatic anhydride are different anhydrides.

2. The resin for a binder suitable for mineral fibers such as glass or stone wool according to claim 1, wherein the first anhydride is a cyclic anhydride.

3. The resin for a binder suitable for mineral fibers such as glass or stone wool according to claim 2, wherein the first anhydride is an aliphatic anhydride.

4. The resin according to claim 3, wherein the aliphatic anhydride comprises one or more anhydrides selected from the group consisting of tetrahydrophthalic anhydride, hexahydrophthalic anhydride, methyltetrahydrophthalic anhydride, succinic anhydride, nadic anhydride, maleic anhydride, and glutaric anhydride.

5. The resin according to claim 1, wherein the aromatic anhydride comprises one or more anhydrides selected from the group consisting of phthalic anhydride, trimellitic anhydride, pyromellitic dianhydride and methylphthalic anhydride.

6. The resin according to claim 3, wherein the concentration of aliphatic anhydride is greater than the concentration of aromatic anhydride.

7. The resin according to claim 1, wherein the amine is a N-substituted beta hydroxy alkylamine selected from the group consisting of ethanolamine, 1-ethylethanolamine, 1-methylethanolamine, n-butyl-ethanolamine, 1-ethylisopropanolamine, 1-methylisopropanolamine, 3-amino-1,2-propanediol, 2-amino-1,3-propanediol, tris(hydroxymethyl)aminomethane, and diethanolamine.

8. A resin comprising a polymer free mixture for a binder, said resin comprising the reaction product of a cyclic anhydride and an amine, at a pH of from about 2.5 to about 4.2, said pH being predetermined to positively influence the curing speed of the resin, wherein said cyclic anhydride comprises a first anhydride and a second aromatic anhydride that is different from said first anhydride.

9. The resin according to claim 8, wherein the first anhydride is an aliphatic anhydride.

10. The resin according to claim 9, wherein the aliphatic anhydride comprises one or more anhydrides selected from the group consisting of tetrahydrophthalic anhydride, hexahydrophthalic anhydride, methyltetrahydrophthalic anhydride, succinic anhydride, nadic anhydride, maleic anhydride, and glutaric anhydride.

11. The resin according to claim 8, wherein the aromatic anhydride comprises one or more anhydrides selected from the group consisting of phthalic anhydride, trimellitic anhydride, pyromellitic dianhydride and methylphthalic anhydride.

12. The resin according to claim 9, wherein the concentration of aliphatic anhydride is greater than the concentration of aromatic anhydride.

13. The resin according to claim 8, wherein the amine is a N-substituted beta hydroxy alkylamine selected from the group consisting of ethanolamine, 1-ethylethanolamine, 1-methylethanolamine, n-butyl-ethanolamine, 1-1-ethylisopropanolamine, 1-methylisopropanolamine, 3-amino-1,2-propanediol, 2-amino-1,3-propanediol, tris(hydroxymethyl)aminomethane, and diethanolamine.

14. The binder for mineral fibers including glass or stone wool comprising the resin according to claim 1.

15. The binder according to claim 14, further comprising an accelerator and one or more resin additives selected from the group consisting of aminopropyl siloxane, thermal stabilizers, UV stabilizers, surface active compounds, fillers, silicates, magnesium sulfate, hydrophobising agents, oils, and minerals.

16. The binder according to claim 15, wherein the accelerator is selected from the group consisting of sodium phosphinate, phosphinic acid, citric acid, adipic acid and g-hydroxyalkylamid.

17. The binder according to claim 14, further comprising one or more additives selected from the group consisting of monosaccharides, disaccharides, and polysaccharides.

18. The binder according to claim 17, wherein the monosaccharides, disaccharides, and polysaccharides are one or more selected from the group consisting of sucrose, glucose syrup, modified starch, starch urea dicyandiamid, polyglycols, acrylics, furfural, carboxymethyl cellulose cellulose, and polyvinyl alcohol.

19. The binder according to claim 14, wherein the binder has been cured.

20. The binder for mineral fibers including glass or stone wool comprising the resin according to claim 8.

21. The binder according to claim 20, further comprising an accelerator and one or more resin additives selected from the group consisting of aminopropyl siloxane, thermal stabilizers, UV stabilizers, surface active compounds, fillers, silicates, magnesium sulfate, hydrophobising agents, oils, and minerals.

22. The binder according to claim 21, wherein the accelerator is selected from the group comprising sodium phosphinate, phosphinic acid, citric acid, adipic acid and g-hydroxyalkylamid.

23. The binder according to claim 20, further comprising one or more additives selected from the group comprising monosaccharides, disaccharides, and polysaccharides.

24. The binder according to claim 23, wherein the monosaccharides, disaccharides, and polysaccharides are one or more selected from the group consisting of sucrose, glucose syrup, modified starch, starch urea dicyandiamid, polyglycols, acrylics, furfural, carboxymethyl cellulose cellulose, and polyvinyl alcohol.

25. The binder according to claim 20, wherein the binder has been cured.

26. The mineral fiber product bound by a cured binder according to claim 14.

27. The mineral fiber product bound by a cured binder according to claim 20.

28. A method for providing a polymer free resin for a binder suitable for binding mineral fiber products, said process comprising the steps of mixing together under reaction conditions an amine with a first aliphatic cyclic anhydride and a second aromatic cyclic anhydride.

29. A resin for a binder suitable for mineral fibers, including glass or stone wool said resin comprising the reaction product of a polymer free mixture of an amine with a first anhydride and a second aromatic anhydride, characterized in that the first anhydride and the second aromatic anhydride are different anhydrides, and wherein flowtime of said resin is reduced by at least a factor of two as contrasted with a binder composition having only one anhydride.

30. A resin comprising a polymer free mixture for a binder, said resin comprising the reaction product of a cyclic anhydride and an amine, at a pH of from about 2.5 to about 4.2, said pH being predetermined to positively influence the curing speed of the resin, wherein said cyclic anhydride comprises a first anhydride and a second aromatic anhydride, and wherein flowtime of said resin is reduced by at least a factor of two as contrasted with a binder composition having only one anhydride.

* * * * *

UNITED STATES PATENT AND TRADEMARK OFFICE
CERTIFICATE OF CORRECTION

PATENT NO.   : 6,730,730 B1
DATED        : May 4, 2004
INVENTOR(S)  : Hansen et al.

It is certified that error appears in the above-identified patent and that said Letters Patent is hereby corrected as shown below:

Column 4,
Line 62, "such as" should read -- including --

Column 5,
Lines 1-2 and 4-5, "such as" should read -- including --
Lines 54-55, "1-1 ethylisopropanolamine" should read -- 1- ethylisopropanolamine --

Column 6,
Lines 11-12, "carboxymethyl cellulose cellulose" should read -- carboxymethyl cellulose, cellulose --
Line 26, "g-hydroxyalkylamid" should read -- ß-hydroxyalkylamid --
Lines 35-36, "carboxymethyl cellulose cellulose" should read -- carboxymethyl cellulose, cellulose --

Signed and Sealed this

Eighth Day of February, 2005

JON W. DUDAS
*Director of the United States Patent and Trademark Office*